United States Patent [19]
Weber

[11] 3,707,903
[45] Jan. 2, 1973

[54] FLASH INDICATOR FOR PHOTOFLASH LAMPS

[75] Inventor: Kurt H. Weber, Pepper Pike, Ohio

[73] Assignee: General Electric Company

[22] Filed: Dec. 4, 1970

[21] Appl. No.: 95,102

[52] U.S. Cl. ................................. 95/11.5 R, 95/11 L
[51] Int. Cl. ............................................. G03b 15/03
[58] Field of Search ..................... 95/11 L, 11.5 R

[56] References Cited

UNITED STATES PATENTS

| | | | |
|---|---|---|---|
| 3,463,067 | 8/1969 | Fauth et al. | 95/11 L |
| 3,380,357 | 4/1968 | Harvey | 95/11.5 |
| 3,537,367 | 11/1970 | Van Duser | 95/11 L |
| 3,545,904 | 12/1970 | Brandt | 95/11.5 |

Primary Examiner—Samuel S. Matthews
Assistant Examiner—Michael L. Gellner
Attorney—Norman C. Fulmer, Henry P. Truesdell, Frank L. Neuhauser, Oscar B. Waddell and Joseph B. Forman

[57] ABSTRACT

In an arrangement of photoflash lamps, one or more of the lamps is provided with a flash indicator pin adhered thereto by means of lacquer or other material which softens due to heat generated when the lamp is flashed, thus permitting the indicator pin to be movable upon the lamp flashing. The flash indicator pin extends from the lamp and coacts with an indicator mechanism in a camera for indicating in the viewfinder whether or not an unflashed lamp is available in position to be flashed, and/or for locking the camera mechanism to prevent operating the shutter if a previously flashed lamp is placed in operating position.

15 Claims, 9 Drawing Figures

PATENTED JAN 2 1973
3,707,903
SHEET 1 OF 2
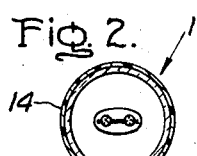
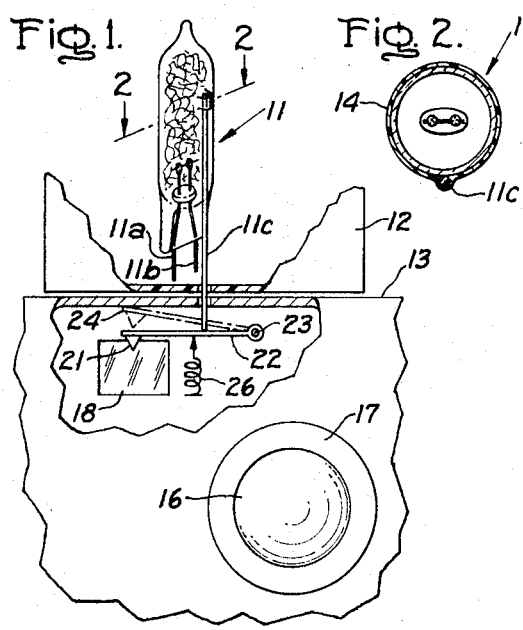
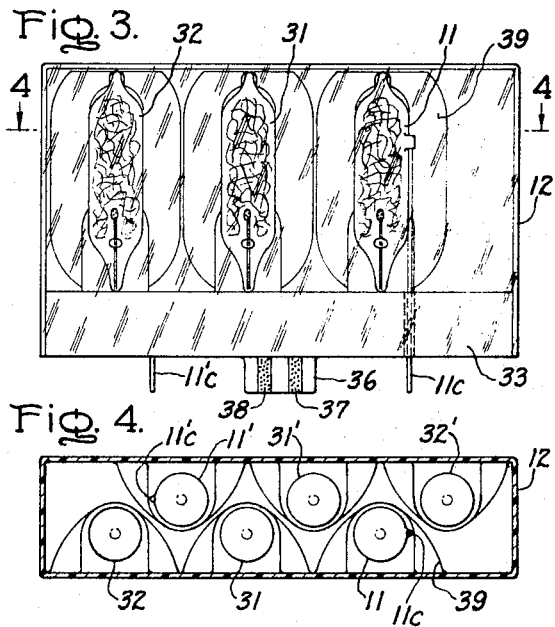
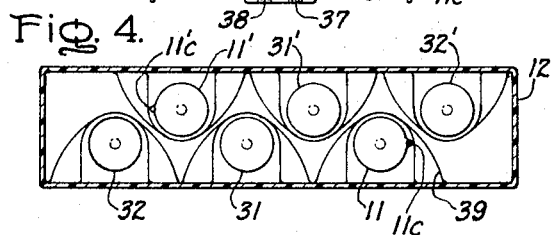
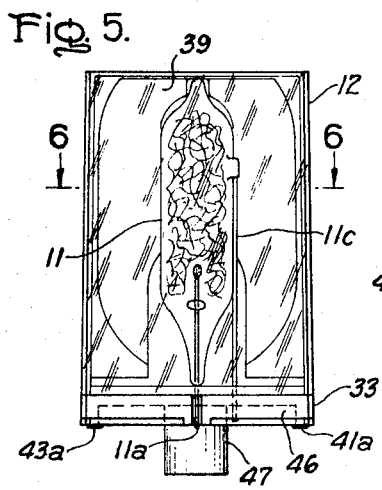
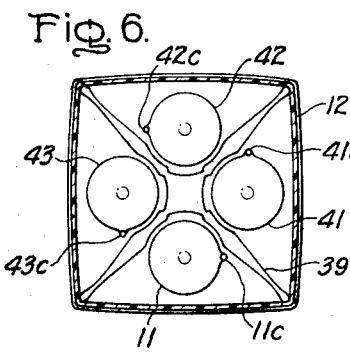
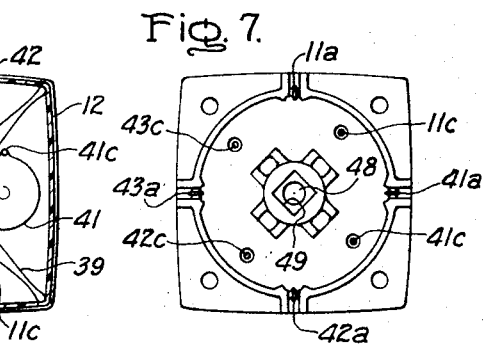
Inventor:
Kurt H. Weber
by Norman C. Fulmer
His Attorney

FLASH INDICATOR FOR PHOTOFLASH LAMPS

CROSS-REFERENCE TO RELATED APPLICATION

U.S. Pat. application Ser. No. 95,291, now patent number 3,668,421, issued June 6, 1972 filed concurrently herewith, of Harry J. Bowers, entitled "Photoflash Lamp Array with Automatic Switching," assigned to the same assignee as the present invention.

BACKGROUND OF THE INVENTION

The invention is in the field of flash photography utilizing photoflash lamps, and is particularly directed to means for indicating whether or not a photoflash lamp has been flashed.

Whether or not a flashbulb has been flashed, usually can readily be determined by visual observation, since a typical flashlamp has a "clear" appearance before being flashed, and a "cloudy" appearance after being flashed. In an assembly of flashlamps contained in a housing, such as the well-known flashcube, it is more difficult to see whether any of the lamps has been flashed, as visibility is reduced due to the housing and extraneous reflections thereon. Such inspection is all the more tedious when the flashcube has been removed from the camera before all of its lamps have been flashed, and it is desired to ascertain which are the remaining unflashed lamps before reattaching the flashcube to the camera. A way of improving visual indication of whether a lamp has been flashed, is to place in, on, or near the flashbulb a "dot" of chemical or heat sensitive material which changes color or disappears when the lamp is flashed.

Many cameras are provided with viewing means and film-winding means which permit a person to take a series of pictures while continuously looking into the viewfinder. Such viewfinders frequently provide means for indicating focus and exposure adjustments. It is particularly aggravating, when using a flashcube with such a camera, to accidentally attempt to take a fifth flash picture with the already-flashed first lamp of the four-lamp flashcube, and considerable wasted film and economic loss thus occurs. On the other hand, it is an annoying inconvenience to try to remember how many flashes have been used, or to frequently moved the camera from picture-taking position and scrutinize the flashcube to determine whether any, or how many, unflashed lamps remain.

A way that has been proposed for indicating unflashed lamps, is to provide indicator lights, which may be arranged to be visible in the camera viewfinder, connected electrically in series with a battery and the filaments of the various flashlamps, so that lighted indicator lights indicate the presence of unflashed lamps. Such an arrangement requires that there by a battery and suitable electrical connections and contacts for connection to the filament lead wires of the flashlamps.

Another way of indicating unflashed lamps, in the "Magicube" percussive ignition arrangement in which a cocked firing spring is provided for each flashlamp, is to provide a "feeler" probe in the camera which determines whether the spring is in cocked position for the lamp that is in firing position and which accordingly operates a suitable visual indicator.

SUMMARY OF THE INVENTION

Objects of the invention are to provide an improved flash indicator for photoflash lamps; to provide an improved mechanical actuated flash indicator means which does not require a battery or indicator lamp; and to provide such means in combination with a camera viewfinder and/or a shutter lockout mechanism. Other objects will be apparent.

The invention comprises, briefly and in preferred embodiment, a photoflash lamp provided with a flash indicator pin adhered thereto by heat-responsive material adapted to soften and permit movement of the indicator pin in response to heat generated by flashing of the lamp. Preferably the heat-responsive pin-adhering material is the lacquer protective coating normally provided on photoflash lamps. The indicator pin coacts with an indicator mechanism for visually or otherwise indicating, by mechanical, optical, or other means, whether or not the lamp has been flashed. In one preferred embodiment of the invention, the end of the indicator pin engages against a spring-loaded indicator mechanism arranged to move an indicator means into or out of view in the camera viewfinder in response to whether or not the indicator pin's adherence to the flashlamp has become loosened due to heat generated upon flashing of the lamp. In a flashcube or other array of a plurality of flashlamps, the flash indicator of the invention can be applied to each lamp, for providing an indication as to whether or not each individual lamp has been flashed; or, alternatively, the flash indicator can be applied only to the last-to-be-flashed lamp, for providing an indication as to whether or not the last lamp has been flashed.

BRIEF DESCRIPTION OF THE DRAWING

FIG. 1 is a front view of a camera and a flashlamp assembly, partly shown in perspective form, illustrating the basic concepts of the invention;

FIG. 2 is a cross-sectional view taken on the line 2—2 of FIG. 1;

FIG. 3 is a front view of a dual-sided linear flashlamp array incorporating the last-flash indicator of the invention;

FIG. 4 is a cross-sectional view taken on the line 4—4 of FIG. 3;

FIG. 5 is a front view of a flashcube in which each of the four flashlamps thereof is provided with a flash indicator in accordance with the invention;

FIG. 6 is a cross-sectional view taken on the line 6—6 of FIG. 5;

FIG. 7 is a bottom view of the flashcube of FIG. 5;

DESCRIPTION OF THE PREFERRED EMBODIMENT

Figure 8:
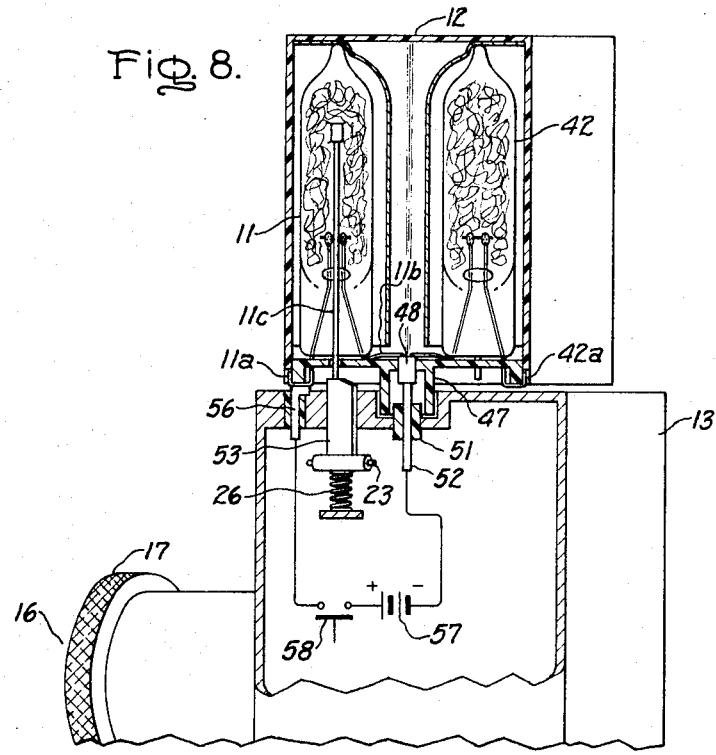
FIG. 8 is a side sectional view of the flashcube of FIG. 5 in combination with a camera similar to that shown in FIG. 1.

In the basic embodiment of the invention as shown in FIG. 1, a photoflash lamp 11 is carried in a housing 12 adapted to be attached to a camera 13. The flashlamp 11 is provided with a pair of filament or igniter lead wires 11a and 11b adapted to be connected to a source of firing pulses for flashing the lamp. The lamp 11 may be a conventional photoflash lamp, such as or similar to General Electric type AG–1 photoflash lamp, which is coated with a protective lacquer 14 to prevent fracturing or disassociation of the glass envelope in case the envelope should crack due to heat when the lamp is flashed. In accordance with the invention, the lamp 11 is provided with an indicator pin 11c, which is adhered to the lamp by means of the normal lacquer coating 14, or by other suitable thermally sensitive adhesive, as shown. This is readily accomplished in manufacture, by holding the indicator pin 11c in position while the lamp is sprayed with, or dipped into, the lacquer. Alternatively, the lamps may be completely manufactured in the normal manner, and then the indicator pin may be adhered thereto by means of a dab of lacquer or other suitable adhesive. The indicator pin 11c may be made of metal, fiber, plastic, or other suitable material. The housing 12 may contain an array of a plurality of photoflash lamps 11, arranged to be flashed in sequence, for taking a plurality of pictures, by means of firing voltage pulses generated in synchronism with the camera shutter. The plurality of photoflash lamps are caused to fire individually in sequence by suitable means such as the switching means disclosed in the above-mentioned copending patent application. Only the last-to-flash photoflash lamp 11 need be provided with a flash indicator pin 11c, as shown in the embodiment of FIGS. 3 and 4, or, alternatively, each lamp of the array may be provided with an indicator pin 11c as in the embodiment shown in FIGS. 5 through 8. The housing 12 and camera 13 are provided with aligned openings through which the flash indicator pin 11c extends into the camera 13 and actuates a flash indicator mechanism as will now be described.

The camera 13 is provided with the usual lens 16, and a shutter 17 which may be the well-known between-the-lens type, or may be the well-known focal plane type of shutter, provided with synchronized means for initiating a firing pulse for flashing a flashlamp. The source of pulse energy may be a battery, piezoelectric device, or other suitable means. Also, a percussion ignition mechanism may be employed. The camera 13 also is provided with a viewfinder 18, which may be of any conventional type such as a direct viewfinder, or the pentaprism viewfinder of a reflex camera. The camera 13 is provided with a flash indicator "flag" 21 attached at the end of a flash indicator arm 22 which is pivoted at its other end 23 with respect to the camera 13 so that the indicator arm 22 may swing vertically about the pivot 23, and thus the indicator flag 21 may be either visible in the viewfinder 18, or non-visible when swung out of view as indicated by the dashed line 24 due to an upward urging by a compression spring 26.

When the flash array housing 12 is plugged into or otherwise attached to the camera 13, the flash indicator pin 11c presses the flash indicator arm 22 downwardly so that the flash indicator flag 21 is visible in the viewfinder 18, thus indicating to the user that the flashlamp 11 has not yet been flashed. When the lamp 11 is flashed, its indicator pin 11c becomes loosened due to the heat of the flashing softening or partially melting the lacquer or other means of attachment of the indicator pin to the lamp, whereupon the indicator pin 11c becomes movable and allows the spring 26 to force the flash indicator arm 22 upwardly to the position 24 so that the flash indicator flag 21 disappears from view thus indicating that the lamp 11 has been flashed. Also, it will be noted, non-visibility of the flash indicator flag 21 in the viewfinder 18 also indicates the absence of a flash array 12 attached to the camera 13. In summary, if the flash indicator flag 21 is visible, it indicates that a flashable flashbulb is in position to be flashed, and, if not visible, it indicates lack of flashability due to absence of a flash unit or due to the lamp 11 having been flashed. Alternatively, the mechanism can be arranged so that a visible flag 21 indicates absence of a flashable lamp. Instead of employing a flash indicator flag 21, the mechanism alternatively may function to move a small mirror or prism for reflecting or refracting a suitable flash indicator signal or symbol into or out of view in the viewfinder 18. The flashlamp 11 may be electrically and mechanically attached to the housing 12 by its lead wires 11a and 11b. The indicator pin 11c extends in the direction of and parallel to the lead wires 11a and 11b so that the force or pressure caused by the spring 26 on the indicator pin 11c and the lamp 11 is readily counteracted and restrained by the attachment of the lead wires 11a and 11b. If desired, however, the indicator pin 11c may extend laterally, or at any angle, from the lamp 11.

In the embodiment of the invention shown in FIGS. 3 and 4, a dual-sided photoflash lamp array is arranged to provide a last-flash indication when the last lamp is flashed at each side of the array. The front and back sides of the array may each have any desired number of photoflash lamps, including the last-to-flash lamp 11 provided with the indicator pin 11c on the front side of the array, and the last-to-flash lamp 11' provided with a last-flash indicator pin 11'c, at the rear side of the unit. Other flashlamps 31, 32, at the front side of the array, and 31' and 32' at the rear side of the array, are adapted to be flashed in sequence, so that a lamp flashes each time a picture is taken. This may be achieved by switching means contained in the base 33 of the housing 12, as disclosed in the above-referenced copending patent application. A connector plug 36 extends downwardly from the base 33 of the housing 12, and may be made of plastic or other electrical contact means 37, 38 printed or plated thereon. Similar connecting means are provided at the rear side of the connector plug 36, so that the array may be plugged into the camera with either its front side or rear side facing frontwardly so that the lamps when flashed can illuminate the scene being photographed. Suitable reflectors 39 are provided in the housing 12 for properly projecting the light produced by flashing of the flashlamps. Thus, when the last flashlamp 11 of the front side of the array is flashed, its indicator pin 11c becomes movable and the flag 21 in the camera viewfinder window 18 disappears, thus indicating that the last lamp has been flashed. The array may then be removed, turned around and plugged into the camera again, this time with its "rear" group of lamps in picture-taking position, whereupon when the last lamp 11' has been flashed, the last flash indicator flag 21 will again disappear from view, indicating that the last lamp has been flashed. Other arrangements of flashlamps may be employed in an array (vertically stacked, for example) employing the last-flash indicator of the invention.

In the embodiment of the invention illustrated in FIGS. 5 through 8, each flashlamp of a photoflash lamp array is provided with a flash indicator pin, so as to provide a flash indication in the camera viewfinder when each successive lamp is flashed. The flashlamp array shown is in the form of the well-known flashcube containing four flashlamps and adapted to be rotated 90° when the film is wound after taking each picture, so as to bring a new lamp into position for illuminating the next scene to be photographed.

The four photoflash lamps 11, 41, 42, and 43 are contained in the housing 12. Individual reflectors 39 are respectively provided for the four lamps. The base 33 is provided with a circular recess 46 at the bottom thereof, and an attachment post 47 extends downwardly from the center of the recessed base 33. Each of the four flashlamps is provided with a flash indicator pin c, all of which extend downwardly through suitable openings in the base 33 and into the recessed portion 46 thereof. This, the lower ends of the indicator pins are sufficiently exposed for coacting with the camera flash indicator as will be described, while at the same time they are protected from accidental damage by being in the recess and by their close adjacency to the attachment post 47 and the outer downwardly extending rim of the base 33.

The a filament lead wires of the respective lamps extend through suitable openings in the base 33 and are bent under the outer periphery of the base 33 and hence upwardly into slots, so that the portions of the a lead wires at the bottom of the base 33 are exposed for making electrical contact with a camera contactor, as will be described. The b lead wires of the lamps are all electrically attached to a common central contact 48 carried by the base 33 centrally thereof and exposed for making electrical connection thereto through a square recess 49 at the bottom side of the attachment post 47. The square recess 49 is adapted to be engaged by a flashcube rotating member in the camera, as will be described. If desired, however, the pair of a and b wires of each lamp may be exposed at the base of the flashcube as is shown for the a wires in FIGS. 5, 7, and 8.

As shown in the cross-sectional side view of FIG. 8, the flashcube is attached to the camera 13 by inserting the square recess 49 of the attachment post 47 over a square-headed rotary member 51 adapted to rotate the flashcube one-quarter turn each time the film is wound in the camera, by a conventional mechanism (not shown) to bring the next flashlamp into forward operating position. An elongated electrical connector rod 52 extends axially through the rotating member 51, and makes electrical contact with the common contact 48 of the flashcube. A flash actuation plunger 53 is provided, which may be integral with the indicator arm 22, or may be in slidable contact thereagainst, so that when an unflashed flashlamp is in operating position, its indicator pin c depresses the plunger 53, thereby lowering the indicator arm 22 so that the flash indicator flag 21 will be visible in the viewfinder 18 (refer to FIG. 1). The plunger 53 may have a beveled edge, as shown in FIG. 8, to facilitate its being depressed when the flashcube is rotated so that the indicator pin such as 11c of an unflashed lamp 11 comes into position over the top of the plunger 53. Alternatively, means can be provided for retracting the plunger 53 while the flashcube is being rotated.

An electrical contact 56 is positioned on the camera 13, and a battery 57 and shutter-synchronized switch 58 are connected electrically in series between the camera contacts 52 and 56. When a flash picture is taken, the switch 58 momentarily closes in synchronization with opening of the shutter, whereby the battery 57 provides a firing pulse which flashes the forwardly positioned flashlamp 11, whereupon the heat generated by the flashing softens the lacquer and the control pin 11c becomes movable, whereupon the spring 26 forces the indicator arm 22 and plunger 53 upwardly so as to move the indicator flag 21 out of view in the viewfinder 18, thus indicating the absence of a flashable flashlamp in operating position. Instead of employing the battery 57 and switch 58 for providing firing pulses, a batteryless arrangement employing a piezoelectric element may be employed, as disclosed in U.S. Pat. Nos. 2,972,937 and 3,106,080, both to Chauncey G. Suits and assigned to the same assignee as the present invention. Other means for firing the flashlamps include the percussion technique.

Figure 9:
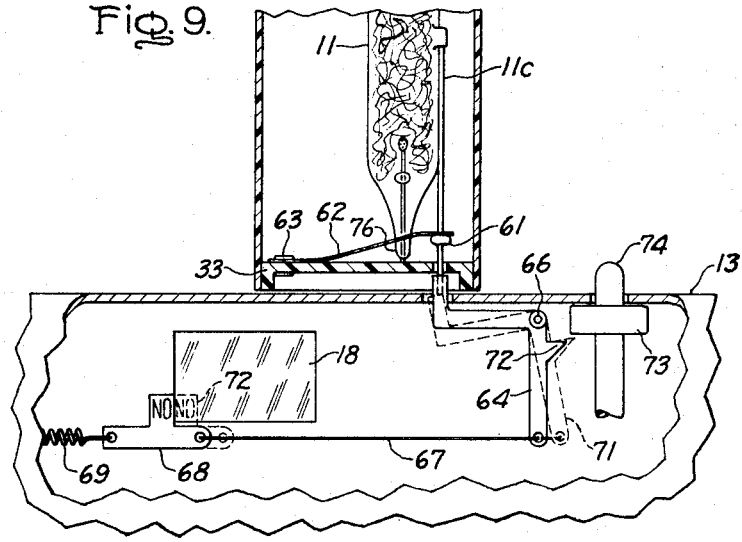
FIG. 9 is a front cross-sectional view of a photoflash lamp arrangement and camera in accordance with alternative embodiments of the invention.

In the embodiment shown in FIG. 9, the flashlamp housing 12 contains a flashlamp 11 provided with an indicator pin 11c attached thereto, as described above, there being a shoulder 61 provided on the indicator pin 11c, as shown. An elongated spring 62 of wire or strip metal or plastic, is attached to the base 33 of the lamp housing 12, such as by means of a rivet 63 at an end thereof, and the other end is positioned over the shoulder 61 of the indicator pin 11c, so as to urge the indicator pin 11c in a downward direction. Preferably the lamp 11 is attached to the base 33 by its lead wires 11a and 11b, with the bottom or lead-seal end 76 of the lamp against the base 33 to provide firm support of the lamp 11 and indicator pin 11c against the downward force or pressure caused by the spring 62. When the lamp 11 flashes, the indicator pin 11c becomes movable as described above, and the spring 62 urges the indicator pin 11c downwardly against an end of an angular lever 64 pivoted at 66 in the camera 13. The other end of the lever 64 is connected by means of a string or wire, or rigid member 67, to an indicator plate 68 which is slidable with respect to the viewfinder 18 and is normally held out of view by means of a spring 69. Thus, when the indicator pin 11c, as moved by the spring 62, moves the lever 64 to the position shown the dashed line 71, the flash indicator plate 68 is pulled into view in the viewfinder 18 as indicated by the dashed line 72, indicating that there is no flashable lamp in operating position. Simultaneously, a projection 72 of the lever 64 moves beneath a shoulder 73 of the picture-taking (shutter activating) pushrod 74 to prevent it from being depressed, thereby providing a shutter lock-out to prevent making an exposure when an already-flashed lamp is in operating position. Also, this lock-up of the push-button rod 74 serves as an indication to the operator as to the lack of an unflashed lamp in operating position in the flashcube. The same principle can, if desired, be provided in other embodiments of the invention.

While preferred embodiments and modifications of the invention have been shown and described, other embodiments and modifications thereof will become apparent to persons skilled in the art, and will fall within the scope of invention as defined in the following claims.

What I claim as new and desire to secure by Letters Patent of the United States is:

1. A flash indicator mechanism for visually indicating whether a photoflash lamp has been flashed, wherein the improvement comprises a flash indicator member adhered to said lamp by means of heat-responsive material adapted to soften from heat generated by the lamp when flashed, thereby permitting movement of said indicator member, and visual flash indicator means having a movable part adapted to contact with said indicator member and move in response to said member becoming movable upon flashing of the lamp.

2. A flash indicator mechanism as claimed in claim 1, in which said flash indicator means is incorporated in a camera provided with a viewfinder, said movable member of the flash indicator means being arranged to cause visual indication in said viewfinder of whether said lamp has been flashed.

3. A flash indicator mechanism as claimed in claim 1, in which said flash indicator means is incorporated in a camera provided with a shutter, said movable member of the flash indicator means being arranged to render said shutter inoperable if said lamp has been flashed.

4. A flash indicator mechanism as claimed in claim 1, in which said heat-responsive material comprises a lacquer coating on said lamp and which also functions as a safety coating to reduce likelihood of the lamp fracturing upon flashing.

5. A flash indicator mechanism as claimed in claim 1, in which said flash indicator member comprises an elongated flash indicator pin.

6. A flash indicator mechanism as claimed in claim 5, in which the lamp is provided with lead wires extending in a given direction therefrom, and in which said flash indicator pin extends from said lamp in said given direction.

7. A flash indicator mechanism as claimed in claim 6, including a housing containing said lamp, said lamp being attached to said housing by means of its lead wires, means causing the extending end of said flash indicator pin to be exposed to the exterior of said housing, said movable member of the flash indicator means being provided with spring means and being positioned to press against said end of the flash indicator pin so as to move when said flash indicator pin becomes movable upon the lamp flashing.

8. A flash indicator mechanism as claimed in claim 5, including a housing containing said lamp, said flash indicator pin being arranged to have an end thereof extend from said lamp, means causing said extending end of the indicator pin to be exposed to the exterior of said housing, and spring means arranged with respect to said housing and indicator pin to cause said indicator pin to move in a direction outwardly of said housing when the indicator pin becomes movable upon the lamp flashing, said movable member of the indicator means being in alignment with said end of the indicator pin so as to be contacted and moved thereby when the lamp flashes.

9. A flash indicator mechanism as claimed in claim 8, in which said indicator pin is provided with a shoulder thereon, and in which said spring means comprises an elongated spring member attached to said housing and engaging said shoulder.

10. A flash indicator mechanism for a photoflash array comprising a housing containing a plurality of photoflash lamps, wherein the improvement comprises at least one elongated flash indicator pin adhered to at least one of said lamps by means of heat-responsive material adapted to soften from heat generated by the lamp when flashed, thereby permitting movement of said indicator pin, and means causing an end of said indicator pin to be exposed to the exterior of said housing.

11. A flash indicator mechanism as claimed in claim 10, in which said end of the indicator pin extends outwardly from the surface of said housing, said housing being provided with one or more outwardly extending projections at said surface near said outwardly extending pin thereby protecting said pin from damage.

12. A flash indicator mechanism as claimed in claim 10, in which said lamps are to be flashed in a predetermined sequence from first to last, and in which said array includes one flash indicator pin, said one flash indicator pin being adhered to said last lamp to flash.

13. A flash indicator mechanism as claimed in claim 10, in which each of said flashlamps is provided with one of said flash indicator pins adhered thereto, an end of each of said flash indicator pins being exposed to the exterior of said housing.

14. A flash indicator mechanism as claimed in claim 13, in which said photoflash array is a flashcube arrangement having four flashlamps and adapted to be successively rotated ninety degrees to successively bring each of its four lamps into operating position, the exposed ends of the four flash indicator pins being at the bottom side of said flashcube and being substantially equally spaced apart along an imaginery circle centered on the axis of intended rotation of said flashcube whereby said exposed ends of the indicator pins will successively assume the same location as said flashcube is successively rotated to its operating positions.

15. A flash indicator mechanism as claimed in claim 14, in which said exposed ends of the flash indicator pins extend downwardly from said bottom side of the flashcube, said flashcube being provided with an attachment post extending downwardly at the center of said bottom side thereof, and an annular shoulder extending downwardly from said bottom side and surrounding said extending ends of the flash indicator pins, whereby said extending ends of the flash indicator pins lie between said attachment post and said shoulder and are protected thereby.

* * * * *